(12) United States Patent
Cerka et al.

(10) Patent No.: US 10,164,354 B2
(45) Date of Patent: Dec. 25, 2018

(54) TERMINAL BLOCK APPARATUS

(71) Applicant: FISHER CONTROLS INTERNATIONAL, LLC, Marshalltown, IA (US)

(72) Inventors: Benjamin August Cerka, Colo, IA (US); Kenneth Eugene Hall, Ankeny, IA (US); Ronald Charles Hager, Marshalltown, IA (US); William Sean Raymond, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/599,992

(22) Filed: May 19, 2017

(65) Prior Publication Data
US 2018/0337470 A1    Nov. 22, 2018

(51) Int. Cl.
*H01R 9/24* (2006.01)
*B62H 3/12* (2006.01)

(52) U.S. Cl.
CPC ............. *H01R 9/2416* (2013.01); *B62H 3/12* (2013.01)

(58) Field of Classification Search
CPC ...... H01R 9/24; H01R 9/2408; H01R 9/2416; H01R 9/2458; H01R 9/2483; H01R 9/2491
USPC .................................................. 439/709, 715
See application file for complete search history.

(56) References Cited

U.S. PATENT DOCUMENTS

| | | | | |
|---|---|---|---|---|
| 2,699,533 A | * | 1/1955 | Harnett | H02G 3/16 174/59 |
| 5,266,057 A | * | 11/1993 | Angel, Jr. | H01R 4/5025 411/393 |
| 7,279,633 B2 | * | 10/2007 | Waters | H02G 3/08 174/50 |
| 7,614,922 B1 | * | 11/2009 | Buse | H01R 4/4818 439/439 |

FOREIGN PATENT DOCUMENTS

DE    1057198    5/1959

OTHER PUBLICATIONS

International Searching Authority, "Search Report," issued in connection with application No. PCT/US2018/030564 dated Jul. 3, 2018, 5 pages.
International Searching Authority, "Written Opinion," issued in connection with application No. PCT/US2018/030564 dated Jul. 3, 2018, 6 pages.

* cited by examiner

*Primary Examiner* — Ross Gushi
(74) *Attorney, Agent, or Firm* — Hanley, Flight & Zimmerman, LLC

(57) ABSTRACT

An example terminal block includes an annular arrangement of terminal pairs. Each of the terminal pairs has a first height and is adjacent another terminal pair having a second height different from the first height.

18 Claims, 3 Drawing Sheets

TERMINAL BLOCK APPARATUS

FIELD OF THE DISCLOSURE

This disclosure relates generally to electrical connection apparatus and, more particularly, to terminal block apparatus.

BACKGROUND

Process control systems are typically controlled by large numbers of field devices such as sensors, transmitters, controllers, etc. that convey information and electrical power by wires (e.g., field wiring). Oftentimes, field devices require a large amount of wiring to terminate at a single, relatively confined location. Long rows of identical termination sections are difficult to properly wire as each terminal is to receive a particular wire. Thus, field devices with numerous wire connections are more likely to be wired improperly.

SUMMARY

An example terminal block includes an annular arrangement of terminal pairs. Each of the terminal pairs has a first height and is adjacent another terminal pair having a second height different from the first height.

Another example terminal block includes an annular arrangement of terminal pairs. Each of the terminals pairs has a first terminal having a first height and is adjacent to a second terminal having a second height different from the first height.

Yet another example terminal block includes means for receiving an annular arrangement of wire pairs. The means for receiving to hold adjacent ones of the pairs at different heights. The terminal block also includes means for terminating ends of the wire pairs in the means for receiving.

Figure 1:
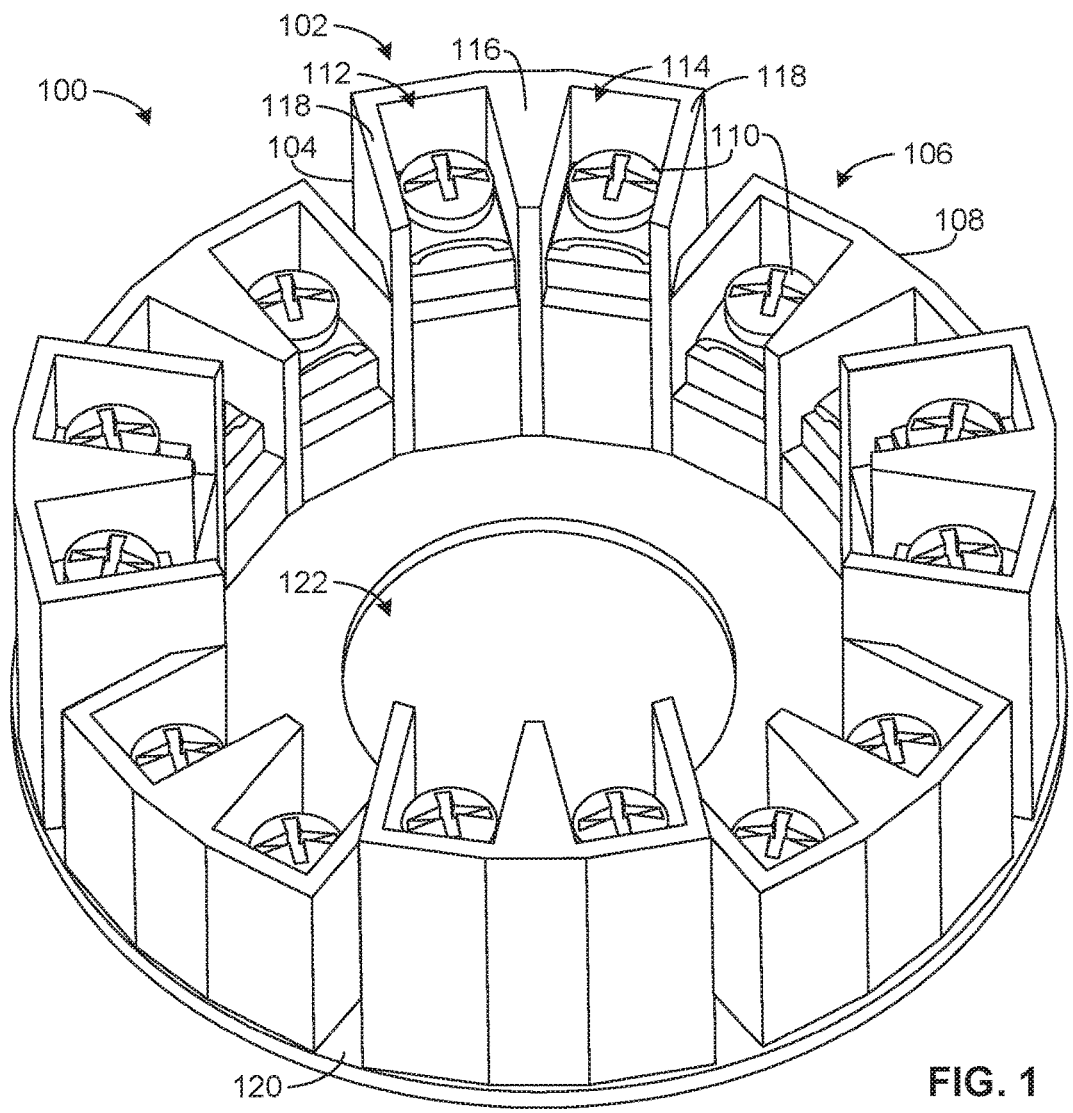
FIG. 1 illustrates an example terminal block in accordance with the present disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Terminal blocks are commonly used in process control systems to connect various field devices with controllers via field wiring. In some examples, a single field device may require numerous wire connections. In such examples, a large number of wires are to be connected or terminated at a terminal block in a relatively confined space. Known terminal blocks are typically configured with identical terminals placed in a row or linear arrangement. This type of arrangement may not make the most efficient use of space and increases the likelihood of improperly wiring a field device due to the difficulty in identifying particular terminals.

Example terminal blocks disclosed herein provide terminals arranged in an annular geometry (e.g., circular shape) and include terminals of different heights. The annular arrangement of terminals provides for more efficient use of space compared to a linear arrangement or rows of terminals. Further, disposing the terminals at different heights facilitates the identification of individual terminals, thereby facilitating quick and correct connection of field device wiring to the terminals.

Terminal connections or terminals typically receive wire ends to mechanically retain the wires and make electrical connections. Various types of terminals include screws, clips, tongue crimps, probes, tabs, wire nuts, turrets, etc. For example, a screw terminal connection fastens an uninsulated wire end via the tightening of a screw.

In an example terminal block disclosed herein, pairs of terminals may be arranged annularly, and the terminal pairs may have different heights to facilitate distinguishing between the pairs of terminals and/or identifying a particular terminal pair. For example, a first pair of terminals may have a first height and a second pair of terminals adjacent the first pair of terminals may have a second height, thereby making the first pair of terminals easily distinguishable from the second pair of terminals. The heights of terminal pairs can alternate through the entire terminal block such that the first pair of terminals has the first height, the second pair of terminals adjacent the first pair has the second height, a third pair of terminals adjacent the second pair has the first height, and so on. In certain examples, more than two heights may be used to distinguish the terminal pairs.

An additional example terminal block described herein includes pairs of terminals arranged annularly such that terminals within each pair have different heights. For example, a first terminal in a first pair has a first height and a second terminal of the first pair adjacent the first terminal has a second height, thereby making the two terminals easily distinguishable from one another. Further, a second pair adjacent the first pair includes a third terminal and a fourth terminal. In some examples, the third terminal is the same height as the first terminal and the fourth terminal is the same height as the second terminal. The heights of the terminals can alternate through the entire terminal block such that the first terminal of the first pair has a first height, the second terminal of the first pair adjacent the first terminal has the second height, a third terminal of the second pair has the first height, and so on. In some examples, more than two heights may be used to distinguish the terminal pairs.

FIG. 1 illustrates an example terminal block 100 having an annular arrangement of terminal connection pairs having different heights. In the illustrated example, the terminal block 100 has eight terminal pairs having two heights, while in other examples, the number of terminal pairs may be greater or fewer.

The example terminal block 100 includes a first terminal pair 102 having a first body portion 104. Adjacent the first terminal pair 102 is a second terminal pair 106 having a second body portion 108. Each of the first terminal pair 102 and the second terminal pair 106 has a pair of terminals 110.

In the illustrated example, the terminals 110 are screw terminals. However, in other examples, the terminals 110 can be any type of terminal connection (e.g., clip, tongue crimp, tab, etc.). Additionally or alternatively, some of the terminals 110 may be one type while other ones of the terminals 110 may be another type.

In the illustrated example, the first body portion 104 and the second body portion 108 have rectangular slots divided by a partition. In some examples, the rectangular slots have an "E" planform shape. For example, the first body portion 104 has two compartments 112, 114, each having a respective terminal 110 adjacent one another and disposed within inner and outer partitions 116 and 118. The example inner partition 116 is angled such that it generally forms a disc sector. In various other examples, the body portions 104, 108 have obround or triangular slots divided by a partition. In some examples, the obround slots may have an "m" planform shape or the triangular slots may have a "w" planform shape. Additionally or alternatively, the outer partitions 118 can be angled to form similar disc sectors. In the illustrated example, the arrangement and shape of the first body portion 104 and the second body portion 108 is such that the periphery of the body portions 104 and 108 form a circular shape.

In some examples, the first terminal pair 102 and the second terminal pair 106 can be manufactured as one piece, can be joined together with an adhesive or joining mechanism (e.g., glue, latch, screw etc.), or can be placed adjacent one another. Further, the first body portion 104 and the second body portion 108 may be formed via an electrically insulating material, such as plastic, ceramic, or rubber. For example, a unitary terminal block body 120 may be formed as a unitary molded plastic body.

In the illustrated example, the first body portion 104 has a height different from the second body portion 108. The difference in height is sufficient to visually distinguish the first terminal pair 102 from the second terminal pair 106 (e.g., 0.25 inch difference). In certain examples the height difference between the example first body portion 104 and the example second body portion 108 may be greater or lesser. Additionally, in some examples, a third body portion may have a third height different from the example first body portion 104 and the second body portion 108.

In some examples, the first body portion 104 and the second body portion 108 are formed together in the unitary terminal block body 120. In the illustrated example, the unitary terminal block body 120 has enough pairs to form a circle of terminal pairs. In other examples, more pairs may be accommodated by a larger circle or the terminal pairs may form a partial circle. Additionally, the unitary terminal block body 120 can include an opening 122 disposed within the annular arrangement of terminal pairs. In some examples, the opening 122 may be central relative to the unitary terminal block body 120. In other examples, the opening 122 may be offset relative to the center of the unitary terminal block body 120. In use, electrical wires can be passed through the opening 122 to facilitate connections to the example terminals 110.

Figure 2:
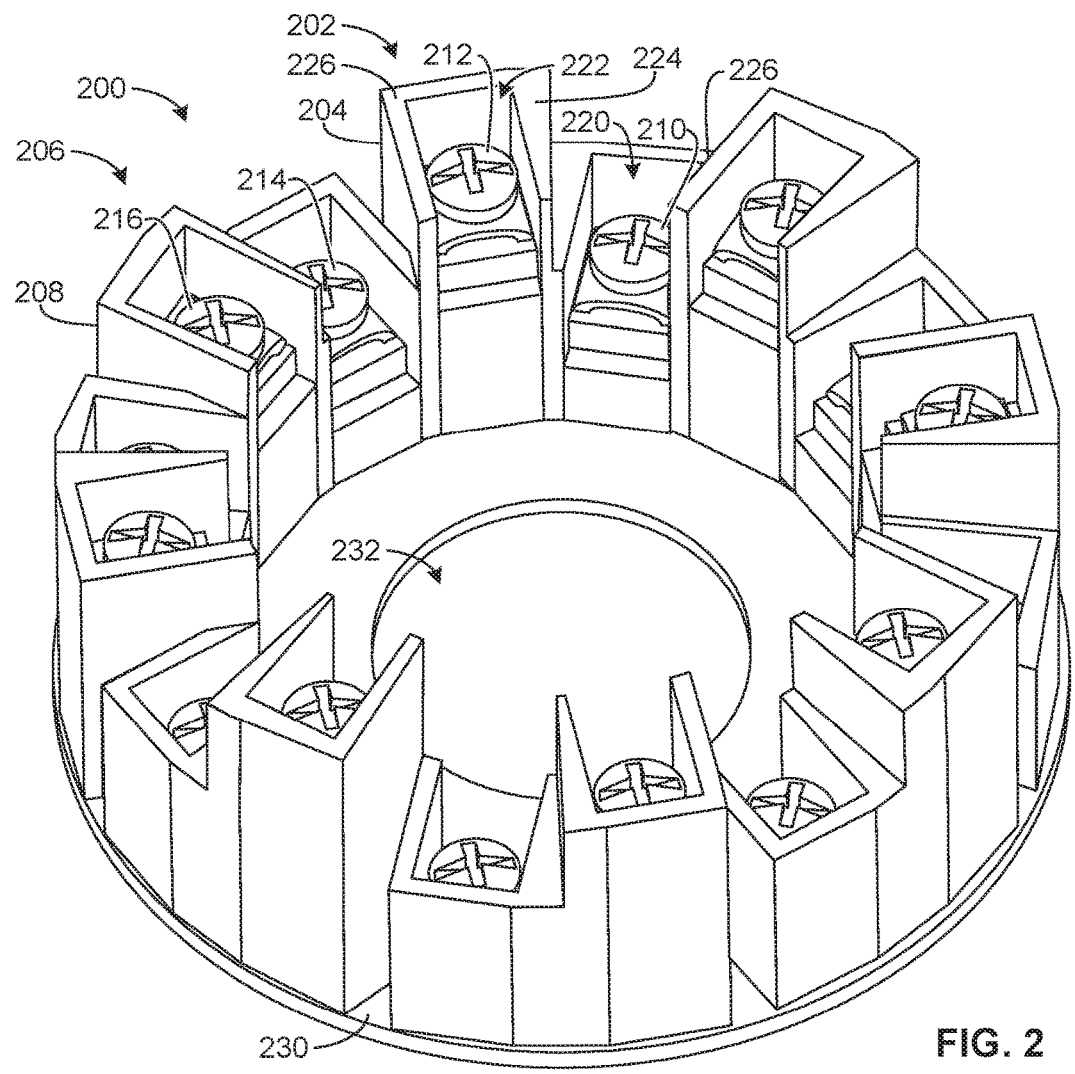
FIG. 2 illustrates another example terminal block in accordance with the present disclosure.

FIG. 2 illustrates an example terminal block 200 having an annular arrangement of terminal pairs having terminals disposed at different heights. In the illustrated example, the terminal block 200 has eight terminal pairs having two heights, while in other examples, the number of terminal pairs may be greater or fewer.

The example terminal block 200 includes a first terminal pair 202 having a first body portion 204. Adjacent the first terminal pair 202 is a second terminal pair 206 having a second body portion 208. The first terminal pair 202 includes a first terminal 210 and a second terminal 212 and the second terminal pair 206 includes a third terminal 214 and a fourth terminal 216. In the illustrated example, the terminals 110 are screw terminals. However, in other examples, the terminals 110 can be any type of terminal connection (e.g., clip, tongue crimp, tab, etc.). Additionally or alternatively, some of the terminals 110 may be one type while other ones of the terminals 110 may be of another type.

In the illustrated example, the first body portion 204 and the second body portion 208 have rectangular slots divided by a partition. In some examples, the rectangular slots have an "E" planform shape. For example, the first body portion 204 has two compartments 220, 222, each having a terminal 110 adjacent one another and disposed within inner and outer partitions 224 and 226 respectively. The example inner partition 224 is angled such that it generally forms a disc sector. In various other examples, the first body or the second body have obround or triangular slots divided by a partition. In some examples, the obround slots may have an "m" planform shape or the triangular slots may have a "w" planform shape. Additionally or alternatively, the outer partitions 226 can be angled to form similar disc sectors. In the illustrated example, the arrangement and shape of the first body portion 204 and the second body portion 208 is such that the periphery of the body portions 204 and 208 form a circular shape.

In some examples, the first terminal pair 202 and the second terminal pair 206 can be manufactured as one piece, can be joined together with an adhesive or joining mechanism (e.g., glue, latch, screw etc.), or can be placed adjacent one another. Further, the first body portion 204 and second body portion 208 may be formed via an electrically insulating material, such as plastic, ceramic, or rubber. For example, a unitary terminal block body 230 may be formed as a unitary molded plastic body.

In the illustrated example, the first terminal 210 has a height different from the second terminal 212. The difference in height is sufficient to visually distinguish the first terminal 210 from the second terminal 212 (e.g., 0.25 inch difference). In certain examples the height difference between the example first terminal 210 and the example second terminal 212 may be greater or lesser. In the illustrated example, the third terminal 214 is adjacent to the second terminal 212 and the third terminal 214 is a different height from the second terminal 212 and the fourth terminal 216. Further, the example third terminal 214 is the same height as the example first terminal 210, while the example fourth terminal 216 is the same height as the example second terminal 212. In other examples, the four terminals may all be of different heights or split amongst three heights, but no two adjacent terminals are of the same height.

In some examples, the first body portion 204 and the second body portion 208 are formed together in the unitary terminal block body 230. In the illustrated example, the unitary terminal block body 230 has enough pairs to form a circle of terminal pairs. In other examples, more pairs may be accommodated by a larger circle or terminal pairs may form a partial circle. Additionally, the unitary terminal block body 230 can include an opening 232 disposed within the annular arrangement of terminal pairs. In some examples, the opening 232 may be central relative to the unitary terminal block body 230, while in other examples, it may be offset relative to the center of the unitary terminal block body 230. In use, electrical wires can be passed through the opening 232 to facilitate connections to the example terminals 110.

Figure 3:
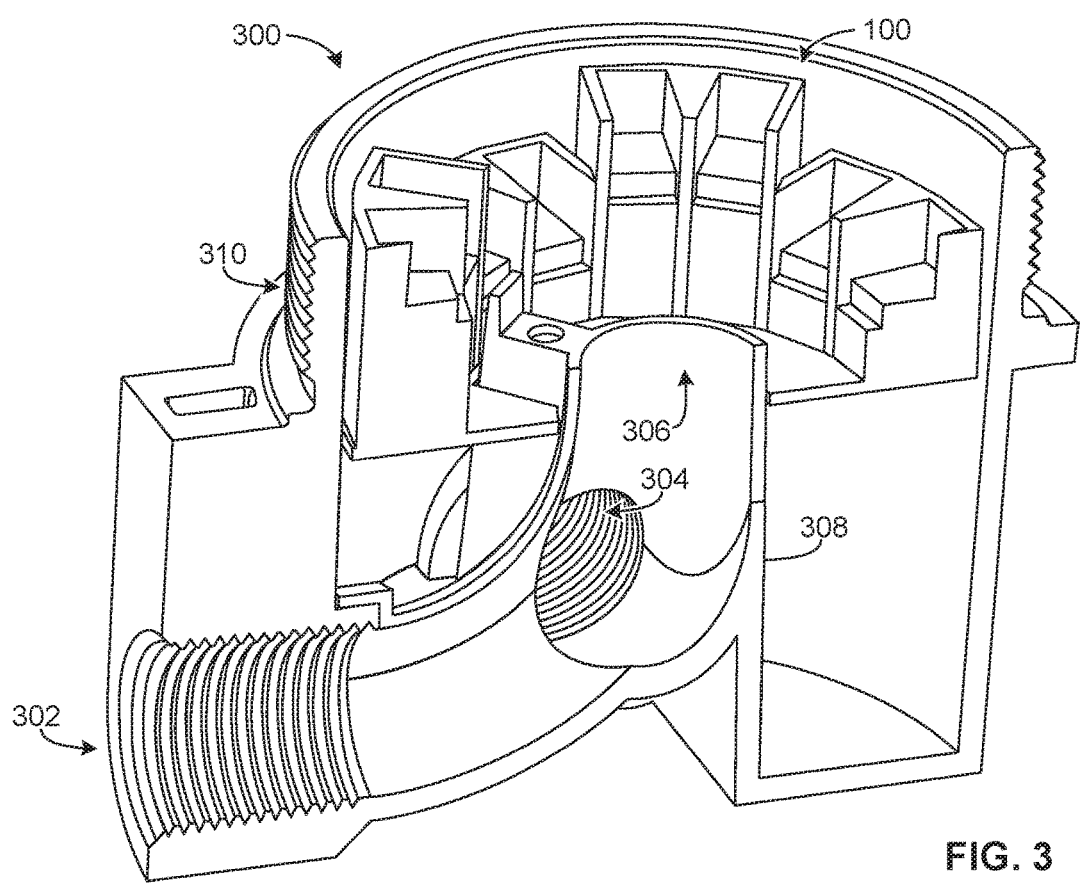
FIG. 3 illustrates an example terminal junction box that may be implemented with the example terminal blocks of FIG. 1 or FIG. 2.

FIG. 3 illustrate an example terminal junction box 300 that may be implemented with the example terminal blocks 100 or 200 of FIG. 1 or FIG. 2. The example terminal junction box 300 of FIG. 3 is illustrated with the example terminal block 100 of FIG. 1.

The example terminal junction box 300 includes a first, second, and third apertures 302, 304, 306 connected via a wire guide 308 that connects to or passes through opening 122 of FIG. 1 or opening 232 of FIG. 2. Wires pass through either the first and third apertures 302 and 306 via the example wire guide 308 or the second and third apertures 304 and 306 via the example wire guide 308 to connect with the terminal block 100 disposed within the example terminal junction box 300.

While the examples disclosed herein are described in connection with industrial field devices, the examples disclosed herein can likewise be implemented with any other type of electrical device requiring a terminal connection.

Although certain example apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A terminal block comprising:
   a body having a central opening; and
   an annular arrangement of terminal pairs surrounding the central opening and oriented so that each of the terminal pairs is to receive respective wires extending through the central opening and radially outward toward the terminal pair, a first group of the terminal pairs having a first height relative to the central opening and a second group of terminal pairs having a second height greater than the first height relative to the central opening, the first group of terminal pairs and the second group of terminal pairs disposed a same radial distance from the central opening.

2. The terminal block of claim 1, wherein each of the terminal pairs includes a pair of screw terminals to capture wire ends.

3. The terminal block of claim 1, wherein the terminal pairs are mounted within a unitary terminal block body.

4. The terminal block of claim 3, wherein the unitary terminal block body is composed of molded plastic.

5. The terminal block of claim 1, wherein each of the terminal pairs includes a pair of clips, tongue crimps, or tab terminals to capture wire ends.

6. The terminal block of claim 1, wherein each terminal pair in the first group is adjacent a terminal pair in the second group.

7. The terminal block of claim 1, further comprising a third group of terminal pairs having a third height relative to the central opening different from the first height and the second height.

8. A terminal block comprising:
   a body having a central opening; and
   an annular arrangement of terminal pairs surrounding the central opening and oriented so that each of the terminal pairs is to receive respective wires extending through the central opening and radially outward toward the terminal pair, each terminal pair having a first terminal having a first height relative to the central opening and a second terminal having a second height greater than the first height relative to the central opening, each of the terminal pairs disposed a same radial distance from the central opening.

9. The terminal block of claim 8, wherein each of the terminal pairs includes a pair of screw terminals to capture wire ends.

10. The terminal block of claim 8, wherein the first heights are equal and the second heights are equal.

11. The terminal block of claim 8, wherein the terminal pairs are mounted within a unitary terminal block body.

12. The terminal block of claim 11, wherein the unitary terminal block body is composed of molded plastic.

13. The terminal block of claim 8, wherein each of the terminal pairs includes a pair of clips, tongue crimps, or tab terminals to capture wire ends.

14. A terminal block comprising:
    means for receiving an annular arrangement of wire pairs, the means for receiving to hold adjacent ones of the wire pairs at different heights and to include a central opening; and
    means for coupling ends of the wire pairs that extend through the central opening in the means for receiving and radially outward toward the means for coupling, the means for coupling disposed a same radial distance from the central opening.

15. The terminal block of claim 14, wherein a periphery of the annular arrangement of wire pairs defines a circular shape.

16. The terminal block of claim 14, wherein the means for coupling includes screw terminals.

17. The terminal block of claim 14, wherein the means for receiving includes a unitary molded plastic body.

18. The terminal block of claim 14, wherein the different heights are two heights.

* * * * *